Figure 1:
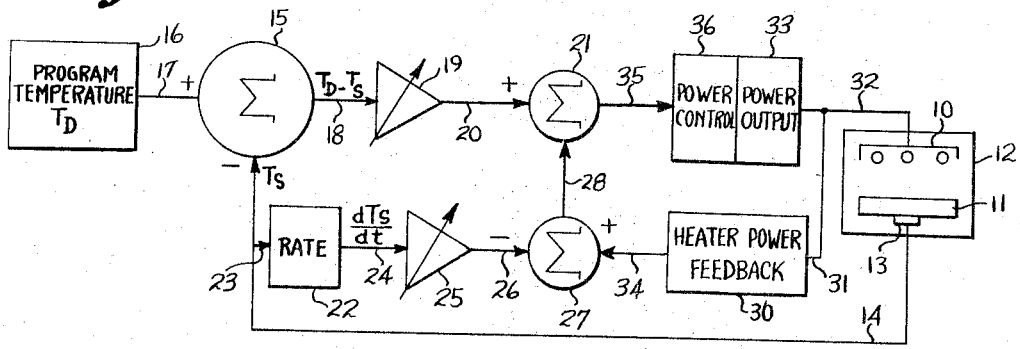

April 18, 1967  E. T. IHLENFELDT  3,315,063
TEMPERATURE CONTROL SYSTEM
Filed May 7, 1964  2 Sheets-Sheet 1

INVENTOR.
EUGENE T. IHLENFELDT
BY Reynolds & Christensen
ATTORNEYS

INVENTOR.
EUGENE T. IHLENFELDT
BY
Reynolds & Christensen
ATTORNEYS

United States Patent Office 3,315,063
Patented Apr. 18, 1967

3,315,063
TEMPERATURE CONTROL SYSTEM
Eugene T. Ihlenfeldt, Kirkland, Wash., assignor to The Boeing Company, Seattle, Wash., a corporation of Delaware
Filed May 7, 1964, Ser. No. 365,772
10 Claims. (Cl. 219—497)

The present invention relates to temperature control systems and more particularly to an improved control and heating system operable to maintain accurate control of the temperature of a specimen subjected to rapid temperature changes over a wide temperature range.

Various types of temperature control systems have been in use in the past, and have generally included the use of a temperature sensing element such as a thermocouple to provide electrical signals representative of the temperature of a specimen. The electrical signals which are proportional to the actual temperature are compared with an electrical signal corresponding to what the thermocouple output should be at the desired temperature so that the difference between the two signals can be used to control the amount of power applied to the heater elements in the system. It has been common in the past to make use of the rate of change of the electrical signal provided by the sensing thermocouple to provide rate of thermal change information in a manner such that thermal overshoot could be controlled and at least partially eliminated. However this has not eliminated steady state errors.

Many prior art systems use a balanced bridge or "null" theory of operation but in general are primarily adapted for use as linear systems wherein temperature rise and fall is substantially linear with respect to applied power. In such systems, it is therefore possible to select a given temperature to which the oven or other type device is to be elevated and to then add sufficient power to compensate for steady state losses taking place in the system at that particular temperature. While such systems work well when used with conventional ovens for heating a given article to a specified temperature, it will be seen that the system if used in nonlinear applications requires adjustment of the power added to compensate for losses whenever the ultimate temperature goal is changed and that generally each adjustment results in temperature accuracy at only one particular temperature. Considerable difficulty is encountered if such control systems are utilized for controlling the temperature of a specimen which is subjected to heating conditions which simulate the heating of an element subjected to high velocity fluids, such as for example in the simulation of the aerodynamic heating of an element subjected to high velocity movement through the air, since accurate temperature control is required at many temperature levels as well as at the intermediate temperatures—i.e. the entire thermal cycle and accuracy of controlled temperature throughout the cycle is of importance. In such tests, just as is the case in actual movement of high velocity bodies in the atmosphere, an object is subjected to very rapid thermal changes over a short period of time and frequently at temperatures which are elevated well beyond 1,000° F. Since the test specimens are frequently thin skinned and are subjected to temperature changes which may exceed 200° F./second the system must be able to provide the power for such high rates of change and yet avoid substantial thermal overshoot.

Thus it will be seen that a basic requirement in conducting such tests is the ability to rapidly supply large amounts of thermal energy to a test specimen in order to achieve the rapid temperature changes and high temperature levels associated with high aerodynamic heating without seriously impeding the natural heat flow characteristics of the test specimen. That is, the conduction, convection, and radiation of heat from the specimen undergoing the test must not be affected by the heating fixture and control system since the conduction, convection, and radiation characteristics of the specimen when subjected to given temperatures and high rates of change thereof are the very factors which are of great importance. Thus in contrast to the usual oven-type heating arrangement adapted to bring an object to a given temperature and to hold it at that temperature in an efficient manner, the heating fixture utilized in simulating aerodynamic heating is designed to be in substance a highly inefficient or high loss oven. It is found that under such high loss conditions the heat flow from a specimen being subjected to rapid thermal changes at widely varying temperatures is a very nonlinear function of the surface temperature. In view of the nonlinearity of the heat flow from the specimen with respect to a given temperature and the desire to avoid interference with the heat loss characteristics thereof, considerable difficulty has been encountered in controlling the power applied to the heating elements in order to accurately simulate a given set of test conditions.

It is therefore an object of the present invention to provide an improved control apparatus adapted to provide accurate control of the power applied to change the condition of a system, as for example the power applied to the heaters of a controlled temperature system, by utilizing information proportional to the rate of change, steady state condition, and total power applied to the system.

It is another object of the present invention to provide an improved temperature control system adapted to continually provide to the heaters of the system sufficient power to accommodate losses in the system per se over a wide temperature range.

Another object of the present invention is to provide an improved temperature control system which operates to continually compensate for thermal losses in the system in a manner such that various selected temperatures are accurately maintained without the need for an error signal.

A further object of the present invention is to provide an improved temperature control system including means for automatically applying an appropriate amount of power to accommodate for losses in the system and particularly in applications wherein a very nonlinear relationship exists between heat flow from a test specimen versus surface temperature of the specimen.

Another object of the present invention is to provide within a temperature control system means for continually maintaining sufficient power for the heaters in the system to accommodate system thermal losses and to simultaneously provide sufficient additional power to produce high rates of temperature change without substantial overshoot.

In accordance with the teachings of the present invention the system is disclosed for use with a test apparatus adapted to provide a preprogramed heat versus time cycle to a test specimen under conditions simulating rapid aerodynamic heating of the specimen. The system as disclosed makes use of infrared lamps to radiate a test specimen in a manner such that the conduction, convection, and radiation of heat from the specimen are relatively unimpeded by the heating system itself. A thermocouple or other suitable temperature sensitive device is positioned adjacent to, and preferably is maintained in contact with the test specimen in a manner such that the temperature sensing element provides electrical signals representative of the temperature of the specimen. The information signal from the sensing element is compared to a program signal corresponding to what the signal level from the sensing element should be at a given temperature. Thus an error signal is generated representative of the magnitude and direction of thermal change required in order to bring the specimen to the programed temperature. The program can be manually controlled by an operator or can be a prerecorded temperature program. Since the system finds susbtantial use in the field of testing specimens having thin skins, it is necessary to provide accurate means for preventing thermal overshoot of the specimen which would normally occur as a result of the rapid temperature changes made to take place in the specimen. Therefore a signal corresponding to the rate of thermal change of the specimen is provided and utilized in the control system to prevent thermal overshoot and to continuously solve the heat equation of the system in the manner indicated hereinafter. The electrical signals provided by the sensing element are differentiated with respect to time to obtain such rate signal. In order to achieve rapid response to changing conditions suitable system gain is provided by amplifiers adapted to amplifiy the error signal and the temperature rate of change signal used in controlling the power applied to the heaters.

While the apparatus thus far described and used in the system will suffice for "oven-type" temperature control, it can be shown mathematically that even if the gain of the error amplifier is increased to the point of system instability, a temperature error proportional to the thermal losses of the specimen exists. Therefore means is provided to determine and automatically supply the power needed to accommodate losses in the system even through such amount of power varies. By so doing the error information is then required only for bringing about a change to a new desired temperature which will then be maintained without the need for a continuing or intermittent error signal. Thus the system is reduced to one analogous to a positioning system in that the error signals control the temperature changes only and overall accuracy is substantially enhanced.

In the embodiment of the invention illustrated herein such provision of adequate power to just overcome losses in the system is provided by means of a compensating network responsive to the total power applied to the heater system and to the rate signal representing rate of thermal change in the specimen. A signal proportional to the total power applied to the heaters has the rate signal subtracted therefrom (taking into account alegbraic signs) so that the heat equation describing the condition of the specimen and system is continually solved and sufficient power to overcome losses in the system is provided even though there is no error signal.

Figure 2:
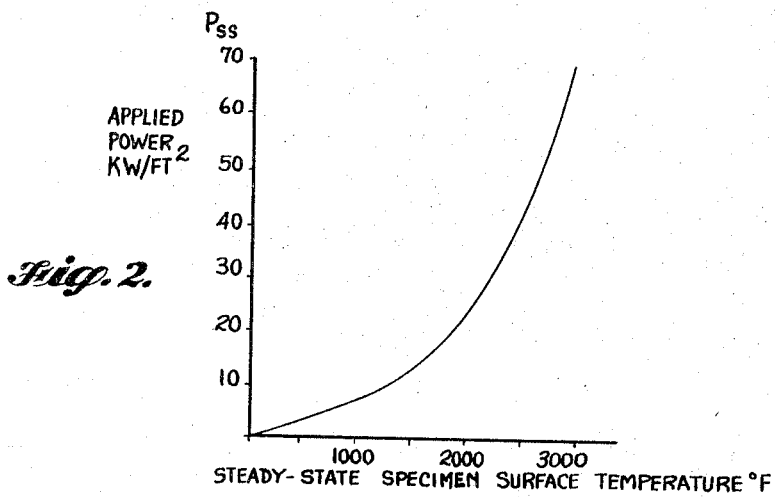
Figure 3:
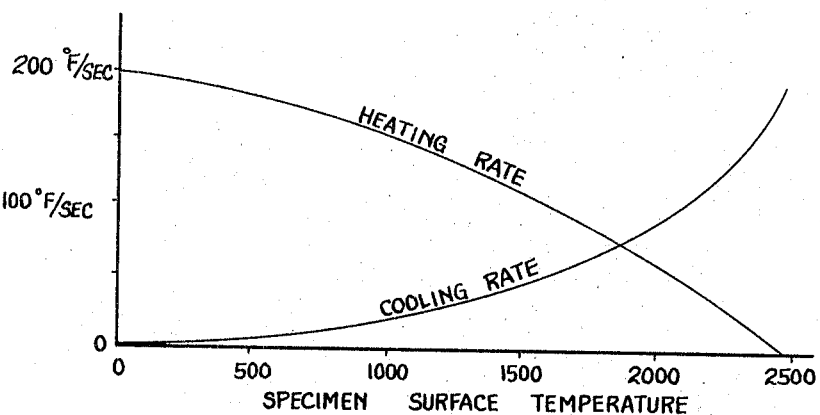
Figure 4:
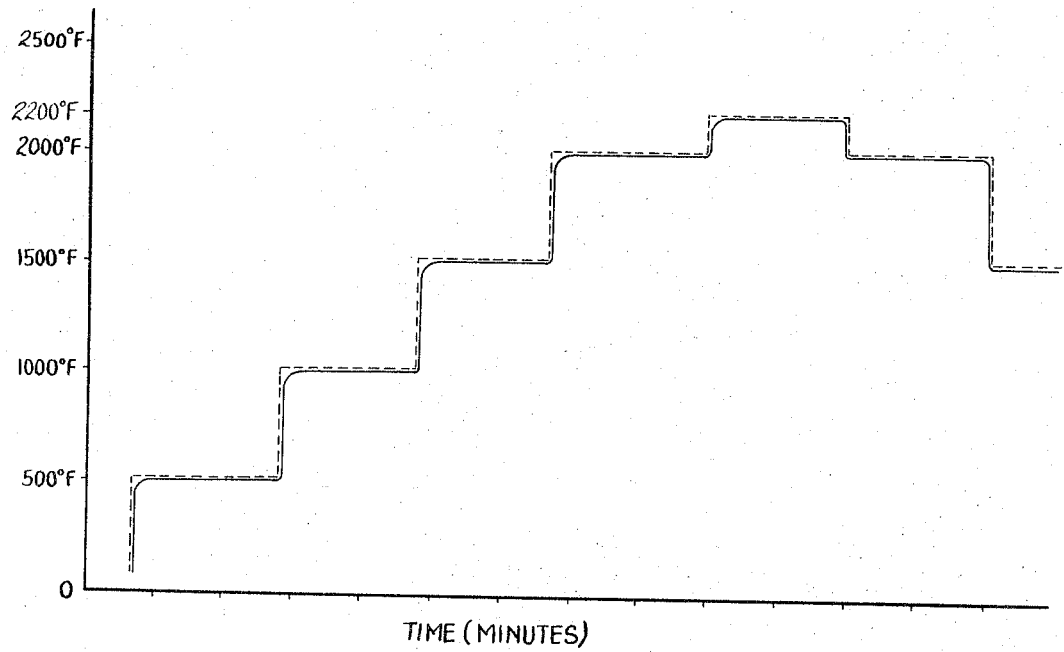
Figure 5:
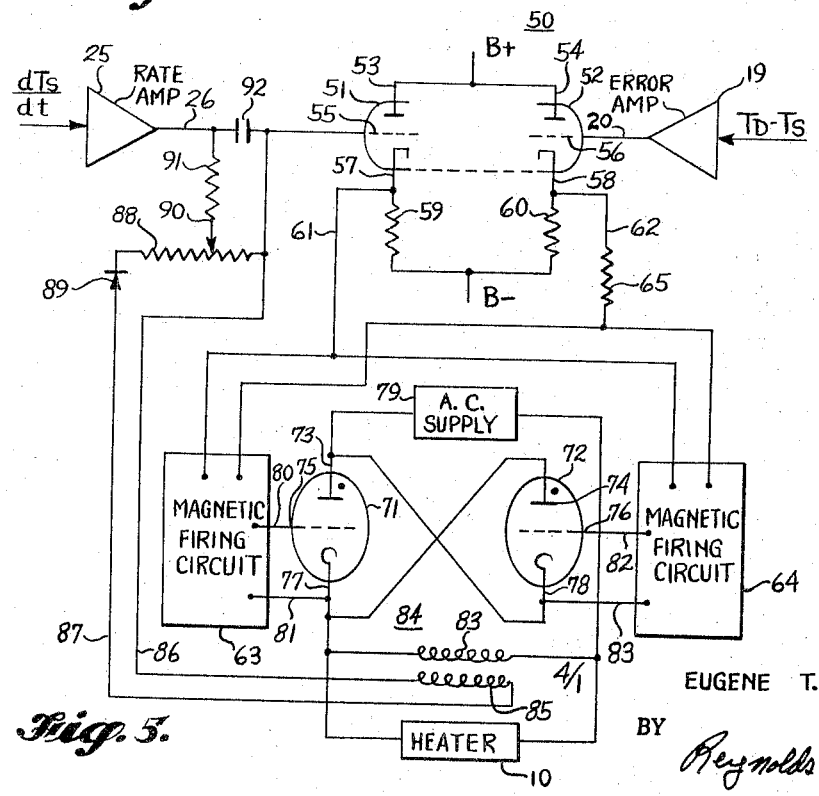

The above and additional advantages and objects of the present invention will be more clearly understood from the following description when read with reference to the accompanying drawings wherein, FIGURE 1 is a block diagram of a preferred embodiment of the control system provided in accordance with the present invention as utilized for controlling the temperature of a test specimen subjected to radiant heating from a set of high power infrared heaters, FIGURE 2 is a graph illustrating the nonlinear relationship of power applied to the test specimen of FIGURE 1 versus the surface temperature thereof, FIGURE 3 is a graph illustrating the manner in which the heating rate and the cooling rate of the test specimen changes in accordance with surface temperature of the specimen, FIGURE 4 is a section of a recorder chart illustrating the manner in which the present system provides rapid temperature changes without thermal overshoot in the specimen and the ability to accurately maintain a given temperature, and FIGURE 5 is a circuit diagram showing in greater detail the power control and loss compensation networks of FIGURE 1.

Referring now to FIGURE 1, a description of a preferred embodiment of the invention as utilized in connection with a test system for testing the thermal capabilities of a thin skinned specimen when subjected to high rates of change of temperature as well as to elevated temperatures analogous to those encountered by high velocity aerodynamic conditions will be given. For purpose of illustration there is shown a heating system including the radiant heating elements 10 such as infrared lamps adapted to radiate thermal energy on the specimen 11, the heater 10 and specimen 11 being illustrated as disposed generally within the heat chamber 12. The arrangement is such that the flow of heat from the test specimen is substantially unimpeded by the system. A thermocouple or other suitable heat responsive element 13 is illustrated as being positioned for sensing the surface temperature of the specimen 11 and in the embodiment of the invention illustrated in FIGURE 1 a thermocouple 13 is welded to the metallic specimen 11. A signal output lead 14 connected to the thermocouple 13 provides signal information identified as $T_S$ corresponding to specimen temperature. The signal lead 14 will be seen to be connected to a first summing network 15 which in addition to having the specimen temperature signal applied thereto is adapted to receive program temperature information from a programming network 16 by means of the lead 17 which is illustrated as applying a program temperature or desired temperature signal $T_D$ to the summing network 15. The summing network 15 can be any of a number well known in the art to subtract signal $T_S$ from $T_D$ (or commonly referred to as an algebraic summation of the voltages applied thereto) so that an output signal $T_D-T_S$ is provided on its signal output lead 18 to a variable gain amplifier 19. While the amplifier 19 can be any of a number known in the art and the details of which forms per se no part of the present invention, it is found in practice that a chopper stabilized high gain amplifier which makes use of A.C. amplification and filtering techniques and yet provides a D.C. signal on its signal output terminal 20 for a second summing network 21 is found to work well. The signal $T_D-T_S$ will be referred to hereinafter as the error signal since it represents the difference between the desired temperature and the actual temperature of the test specimen.

While the error signal alone might be used for controlling the power applied to the heating elements 10 in order to correct for differences between the actual specimen temperature and the desired specimen tempearture, it is found that in order to avoid thermal overshoot and oscillations in the system the rate of change of the temperature of the specimen must be taken into account. Thus for purpose of illustration there is shown a differentiating network labeled in the embodiment of FIGURE 1 as a rate network 22 having a signal input circuit 23 which is connected to the signal output circuit 14 of the thermocouple 13. In a manner well known in the art the rate network 22 is adapted to provide on its signal output circuit 24 a signal representative of the first derivative with respect to time of the signal from the thermocouple 13. Thus for purpose of illustration the signal output lead 24 from the rate network 22 is shown as providing a signal $dT_S/dt$. The rate signal is applied to an associated amplifier 25 substantially identical to amplifier 19 and having its signal output circuit 26 coupled with a third summing network 27 for solution of a heat equation in the manner described hereinafter.

As set forth previously, in any temperature control system certain thermal losses are encountered, and such losses are particularly great in a system wherein aerodynamic heating of a specimen is being simulated since the conduction, convection, and radiation characteristics of the specimen undergoing test must not be impeded by the heat source. Thus it will be seen that in addition to the usual and unavoidable thermal losses from the overall system additional thermal losses are intentionally encountered so that valuable information regarding the ability of the specimen to dispose of heat can be achieved. Therefore, means must be provided for constantly supplying to the heaters 10 sufficient power to overcome the losses in the system, and such means must be adapted to compensate for such losses even though the heat dissipation characteristics of the specimen undergo substantial nonlinear variations with respect to the temperature of the specimen.

In order to achieve the above compensation for losses in the system a feedback network 30 will be seen to have a signal input circuit 31 connected to the power output circuit 32 which extends from the power network 33 to the heaters 10. The output circuit from the circuit 30 is indicated at 34 and will be seen to be connected as an input circuit to the summing network 27. The summing network 27 will be seen to be coupled by means of its output circuit 28 to the second summing network 21 which in turn has a signal output circuit 35 connected to a power control network 36 which is directly associated with the power system 33. It should be understood that while an electric heating system is illustrated for teaching the invention, that other types of systems might be used.

The summing network 27 together with the associated circuitry for providing signals representative of the total power applied to the heaters, the specimen rate of temperature change, and corrective control for the power system operates as a loss compensation network. This loss compensating network serves to accommodate heat losses in a manner best illustrated by reference to the thermal equations representing the temperature conditions of a specimen 11 subjected to heating in the system of FIGURE 1. In general the following equation describes the relationship of applied power versus temperature of a thin skinned test specimen being heated by radiation:

$$EP = C_p W \frac{dT_s}{dt} + \sigma \epsilon T_s^4 + H(T_s - T_{ambient}) \quad (1)$$

$E$ = energy transfer efficiency
$P$ = electrical power applied to the heater
$C_p$ = specific heat of the heated material
$W$ = weight of the heated material
$\sigma$ = radiation constant
$\epsilon$ = surface emissivity of the heated material
$T_s$ = surface temperature
$T_{ambient}$ = ambient temperature
$H$ = geometric configuration factor (heater and specimen)
The $$C_p W \frac{dT_s}{dt}$$

term represents the heat flow required to change the surface temperature at a rate of $dT_s/dt$.
The $\sigma \epsilon T_s^4$ term represents the heat flow from specimen surface due to radiation.
The $H(T_s - T_{ambient})$ term represents the heat flow from the specimen surface due to conduction and convection.
In the steady state condition, the $dT_s/dt$ term becomes zero and the equation becomes:

$$EP_{ss} = \sigma \epsilon T_s^4 + H(T_s - T_{ambient})$$

$P_{ss}$ is the applied power required to sustain the thermal losses of the specimen at any given temperature. A typical curve of $P_{ss}$-versus-temperature is shown in FIGURE 2.

In the system of the present invention the rate information is used as follows. The rate signal, $e_{rate}$, represents the power required to change the specimen temperature.

$$e_{rate} = K C_p W \frac{dT_s}{dt} \quad (2)$$

The power signal, $e_{power}$, represents the total power applied to the heater.

$$e_{power} = K[C_p W \frac{dT_s}{dt} + \sigma \epsilon T_s^4 + H(T_s - T_{ambient})]$$

Their difference, $e_{power} - e_{rate}$, is the desired compensating signal $$e_{compensating} = e_{power} - e_{rate} = K[\sigma \epsilon T_s^4 + H(T_s - T_{ambient})]$$
$$= KEP_{ss} \quad (3)$$

The constant, K, is selected so that when the compensating signal alone is fed to the power controller, the applied heater power is $P_{ss}$. Thus the control system is reduced to a simple "position" type system, i.e., no error signal is required to maintain the desired temperature. In practice the factor K need not be derived mathematically but is obtained by adjusting a feedback potentiometer in the system until zero error signal is achieved for a given programed temperature. Thereafter the system operates accurately over a wide range of temperatures without any further adjustment.

The system disclosed in FIGURE 1 serves to carry out and constantly solve the above thermal equations. Thus it will be seen that subtraction of the output signals from the rate amplifier 25 from the power signal provided by network 30 provides a signal proportional to the sustaining power $P_{ss}$ required for maintaining the temperature of the specimen constant. By adding the resulting signal from summation network 27 to the error signal provided from the first summing network 15 in the summing network 21 the required control of power applied to the heater 10 is obtained. In the absence of any error signal the sustaining power alone will be provided to the heater 10 while the error signal will be added algebraically to the compensating signals. It should be noted that the error signal $T_D - T_S$ is indicated as being applied in a plus (+) manner to the summation network 21, the rate signal as a minus signal (−), and the power feedback signal as a plus (+). This is to indicate that the factors have an algebraic sense and that the rate signal as applied to network 27 is subtracted from the power feedback signal.

Since it is the function of the loss compensating network and including the rate network to provide a driving signal to the power system which is of sufficient magnitude that in the absence of an error signal the applied heater voltage level is exactly that required to maintain the specimen temperature at equilibrium, it will be seen that once adjusted for a given system the loss compensation network needs no further adjustment even though the heat dissipation characteristics of the specimen changes nonlinearly with respect to temperature. Thus in practice a dummy steel specimen has the thermocouple 13 spot-welded thereto and a temperature is then programed by the system 16 into the first summing network 15 so that an error signal is provided. The temperature of the specimen is then brought to the temperature indicated by the program network 16. The loss compensation network is then adjusted until there is zero error signal provided from the summing network 15 over an extended period. At this time it will be seen that the adjustment of the loss compensation network 30 then corresponds to sufficient control being applied to the power system so that exactly the correct power is applied to the heater 10 for overcoming system losses. Hence the temperature of the specimen 11 remains constant and there is no error signal provided from the summing network 15. In practice this condition is indicated by means of a millivolt meter connected between the circuits 14 and 17 in the system of FIGURE 1 with the loss compensation network 30 then being adjusted until a zero reading is maintained.

While various specific circuit arrangements can be utilized to carry out the teachings of the invention disclosed with reference to FIGURE 1, there is shown in FIGURE 5 a specific circuit arrangement which has been found to be suitable for use as the loss compensation network 30 in combination with thyratrons in a power control system for providing power to the heater elements 10. Referring now to FIGURE 5 it will be seen that the power system and associated power control system includes a floating differential amplifier including the triodes 51 and 52 having, respectively, plates 53 and 54, grids 55 and 56, and cathodes 57 and 58. Suitable B+ and B— voltage is provided for operating the differential amplifier. Suitable cathode resistors 59 and 60 are connected in the cathode circuits of the triodes 51 and 52. As is well known in the art, the voltage associated with current flow through the cathode resistors 59 and 60 will vary in accordance with the difference in the level of control signals applied to the two control grids 55 and 56. The control signals for the grids 55 and 56 are respectively provided by a summing network described hereinafter for the grid 55 and the error signal $T_D-T_S$ from the error amplifier 19.

The resulting differential signal provided by changes in current flow through the resistors 59 and 60 is applied by means of the leads 61 and 62 as a D.C. signal to a pair of magnetic firing circuits 63 and 64 associated with the main power supply system illustrated in FIGURE 1 as controlling the heater elements 10. A dropping resistor 65 will be seen to be connected in the signal output circuit 62 connected to cathode 58.

While various well known power circuits could be used there is shown in FIGURE 5 a pair of heavy-duty thyratrons connected in one power control arrangement found to work well. In FIGURE 5 it will be seen that the two thyratrons 71 and 72 have their plates and cathodes respectively interconnected. That is, plate 73 of thyratron 71 is directly connected to the cathode 78 of thyratron 72 while the plate 74 of thyratron 72 is directly connected to the cathode 77 of thyratron 71. Thus the net power to the heaters 10 will depend upon the degree of conduction permitted in the two thyratrons. The extent to which the thyratrons are permitted to conduct is controlled by the two magnetic firing circuits 63 and 64, said firing circuits respectively having signal output circuits 80 and 81 connected to the grid and cathodes 75 and 77 and 82 and 83 connected to the grid and cathodes 76 and 78. The firing circuits per se form no part of the invention and since they are well known in the art as used in combination with thyratrons for controlling the power output from an A.C. supply to a given load further details are not included herein. In substance the magnetic firing circuits serve to provide to the heater elements 10 power which is proportional to the level of the D.C. signals applied thereto. The magnitude of the D.C. signal applied to the magnetic firing circuits serves to determine the percentage of each cycle that the thyratrons 71 and 72 conduct.

A feedback transformer for providing signal information proportional to the total power applied to the heater elements 10 is obtained by means of a primary winding 83 in a step-down transformer 84, winding 83 being directly connected in parallel with the heater elements 10 and having associated therewith the secondary winding 85. While the magnitude of the voltage fed back is per se of no particular consequence in the system disclosed herein a four-to-one step-down transformer was used in one sytem since the A.C. supply utilized in that system was a 480 volt supply. This eliminated the need for high voltages in the control system since the use of a four-to-one step-down transformer meant that the greatest voltage applied to the secondary winding 85 was in the order of 120 volts.

Leads 86 and 87 will be seen to be connected to opposite ends of the resistor 88 with a diode 89 being connected in the signal lead 87 so that unidirectional current flow is provided through the resistor 87 in response to the feedback signal in the transformer 84. Depending upon the gain setting in the loss compensation network a given percentage of the full voltage developed across the resistor 88 is sensed by the variable contact 90 and applied through the dropping resistor 91 to one side of a capacitor 92 to which the other signal lead 86 is directly connected. It will be seen that the signal output circuit 26 of the rate amplifier 25 is similarly connected to the capacitor 92 so that the voltage applied to the grid 55 of the triode 51 will be proportional to and representative of the summation of the signal fed back from the sensing transformer 84 and the signal provided on the signal output circuit from the rate amplifier 25. In order to avoid unnecessary fluctuations in the signals applied to the differential amplifier 50 and to smoothen the system operation the value of the capacitor 92 and the resistor 91 are preferably so chosen that their time constant is in the order of 5 seconds. In one system constructed in accordance with the invention the capacitor 92 was chosen to be 20 microfarads and resistor 91 as 250,000 ohms giving a time constant of 5 seconds.

As described in connection with FIGURE 1, the system shown in detail in FIGURE 5 serves to provide to the heater elements 10 sufficient power to accommodate thermal losses in the system. Since the primary winding 83 in the power feedback circuit is directly connected in parallel with the heater elements 10 it will be seen that a signal is fed back to the triode 51 through the capacitor 92 and resistor 91 which is proportional to the voltage applied to the heaters. This voltage is a function of the power applied to the heater and hence is determinative of the heat applied to the specimen.

From the above it will be seen that under a given set of conditions when an error signal exists corresponding to a difference in the actual temperature of the specimen as compared to the desired temperature provided by the program system 16 appropriate corrections will be made in the degree of conduction of the thyratrons 71 and 72. That is, if the error signal is positive in sign triode 52 will be made more conductive so that a greater differential signal is applied to the magnetic firing circuits and hence the thyratrons are made to conduct during a greater percentage of each cycle of the applied A.C. current. Hence greater power is applied to the heater elements which tends to reduce the above assumed error signal. As the error signal is reduced to zero the state of conduction of the triode 52 will be reduced to a given preset level. However even though the error signal is reduced to zero the overall circuit is adjusted so that power is still supplied to the heater elements 10. This adjustment is accomplished by means of the potentiometer provided by resistor 88 and lead 90 and is done so that the error signal remains zero over a substantial period of time. Therefore even though the error signal is zero a differential signal is provided by the amplifier 50 and hence exactly the right amount of power is provided through the thyratrons 71 and 72 to compensate for system losses.

An example of the operation can be made by assuming that the system is in equilibrium and at a given first temperature. With the error signal being zero it will be seen that if the program system 16 calls for a sudden substantial increase in the temperature of the specimen that a substantial error signal $T_D-T_S$ will be applied to the grid 56 in the form of a positive signal. Thus the conduction of triode 52 will be substantially increased and the D.C. signal applied to the magnetic firing circuits 63 and 64 will be substantially increased leading to a sudden increase in power applied to the heater 10. This immediately causes an increase in the temperature of the specimen 11 with such sudden increase giving rise to a relatively large rate signal $dT_S/dt$. As indicated in FIGURE 1, the rate signal is applied in a manner to achieve a negative effect or detract from the error signal when the temperature of the specimen 11 is increasing. Since the amplifier 50 is a floating differential amplifier it will be seen in FIGURE 5 that the rate signal is applied as a positive signal through the capacitor 92 to the grid of triode 51 to thereby tend to decrease the differential signal to the magnetic firing circuits. However at the same time as the rate amplifier 25 is applying its signal to one side of the capacitor 92 a relatively large signal is being provided from the transformer 84 through diode 89 and the potentiometer including the lead 90 and resistor 88 to the same side of the capacitor 92. Thus the power feedback signal and the rate signal are algebraically added (i.e. the rate signal is subtracted from the power feedback signal) and applied to the grid 55. As the heat losses of the system increase the grid 55 is driven more negative so that a larger differential signal exists for the firing circuits and thus the power applied to the heaters is increased. As the temperature of the specimen approaches the new desired temperature the error signal is reduced toward zero. As the error signal reduces to zero the rate signal will be seen to decrease and hence the restraint provided by the rate amplifier 25 decreases. As indicated by the heat flow equation for the test specimen, the total power being applied to the specimen includes rate information and therefore the signal provided on leads 86 and 87 in FIGURE 5 includes the rate factor. Therefore by continually subtracting the rate information from the total power information it will be seen that a follow-up operation occurs with a constant solution for the heat flow equation taking place until the system zeroes in to a condition wherein the error and rate signals are zero. At that time it will be seen that the only power applied to the heater 10 is that required to compensate for system losses as indicated by Equation 3.

In FIGURE 4 there is represented a section of a recorder chart showing time in minutes plotted versus the temperature achieved by the system of FIGURE 1 in response to a typical test program used to ascertain whether or not the system is able to rapidly and accurately bring a given test specimen to various selected temperatures without considerable overshoot and in a manner such that the steady state temperature of the specimen is accurately maintained at each selected level. In FIGURE 4 the programed temperature is in dotted lines and the temperature achieved is the solid line. The importance of the ability to rapidly achieve the various temperature plateaus indicated in FIGURE 4 when using a test specimen having the nonlinear characteristics of FIGURE 2 is further evident by reference to FIGURE 3 wherein the general heating rates and cooling rates for a given specimen are indicated under the thermal conditions indicated. Thus it will be seen that the system of FIGURE 1 serves to change the power applied to the heaters so that even though the heating and cooling rates of the specimen undergo the nonlinearities indicated in FIGURE 3 as the surface temperature of the specimen changes the heater elements will be constantly provided with sufficient power to overcome thermal losses and yet avoid any substantial overshoot or hysteresis.

There has thus been disclosed an improved control system illustrated as being used in a temperature control arrangement. It is intended that the various modifications of the invention which will be evident to a person skilled in the art from the teachings hereof will be encompassed by the following claims.

What is claimed is:

1. A control system comprising in combination: an electrical power source having a load circuit; an object adapted to have a selected condition thereof changed in response to a change in the power applied to said load circuit and to assume a steady state condition when the power applied to said load circuit is constant; sensing means responsive to said selected condition of said object and adapted to provide an information signal proportional thereto; program means adapted to provide a program signal corresponding to a predetermined condition of said object; error signal means coupled with said program means and with said sensing means responsive to said program signal and to said information signal to provide an error signal; rate signal means coupled with said sensing means responsive to said information signal and providing a rate signal proportional to the rate of change of said information signal; power signal means coupled with said load circuit and providing a power signal which is a function of the power applied to said load circuit; and power control means coupled with said rate signal means, said error signal means, said power signal means and said power source and providing to said power source a control signal proportional to the sum of said error and power signals minus said rate signal.

2. A control system in accordance with claim 1 wherein: said load circuit includes heater means, said object is positioned for heating by said heater means, said selected condition is the temperature of said object, and wherein said sensing means is adapted to provide an electrical signal proportional to the temperature of said object.

3. A control system in accordance with claim 1 wherein: said power control means includes a first summing network coupled with said power signal means and said rate signal means and providing a loss compensation signal in response to signals applied thereto, and a second summing network coupled with said error signal means and with said first summing network to receive said error signal and said loss compensation signal and to provide said control signal in response thereto.

4. A control system in accordance with claim 3 wherein: said second summing network includes first and second cathode follower circuits respectively coupled with said error signal means and with said first summing network for receipt of said error signal and said loss compensation signal and wherein said power control means further includes a power gating circuit and gating circuit control means coupled with said cathode follower circuits and responsive to the voltage difference between two selected points in said first and second cathode follower circuits to control the current flow to said load in proportion thereto.

5. A temperature control system comprising in combination: sensing means adapted to provide a first signal representative of the temperature of an object to be heated; error signal means coupled with said sensing means and responsive to said first signal to provide an error signal representative of the difference between the actual temperature of said object and the desired temperature of said object; heating means operable when energized to apply heat to said object; power means coupled with said heating means; power signal circuit means coupled with said power means to provide a power signal which is a function of the power applied to said heating means; rate signal means coupled with said sensing means adapted to provide a rate signal proportional to the rate of change of temperature of said object; first signal summing circuit means coupled with said error signal means, said power signal circuit means and said error signal means and operative to add said error signal with said power signal and to subtract said rate signal to thereby provide a control signal; and power control means coupled with said summing circuit means and said power means responsive to said control signal for controlling the power provided by said power means to said heating means.

6. A temperature control system comprising in combination: electric heater means adapted when energized to apply heat to a specimen; electric power means coupled with said heater means; power signal circuit means coupled with said power means adapted to provide a power signal which is a function of the power applied to said heater means; sensing means adapted to provide an information signal proportional to the temperature of said specimen; rate circuit means coupled with said sensing means adapted to provide a rate signal proportional to the rate of change of the temperature of said specimen; program means adapted to provide a program signal corresponding to the level of signal provided by said sensing means when said specimen is at a selected temperature; error signal means coupled with said program means and with said sensing means and providing error signal proportional to the difference between said program and information signals; and electric power control means coupled with said power means, said error signal means, and said rate signal means and providing a control signal to said power means to thereby cause said power means to apply to said heater sufficient power to correct for heat losses in the system and to change the temperature of said specimen until said error and rate signals are reduced substantially to zero.

7. A temperature control system in accordance with claim 6 wherein said electric power control means includes: a first summing network coupled with said rate circuit means and with said power signal circuit means and adapted to provide a loss compensation signal proportional to the difference between said rate signal and said power signal, and a second summing network coupled with said first summing network, with said error signal means, and with said power means and adapted to provide a control signal to said power means which is proportional to the sum of said error signal and said loss compensation signal.

8. A temperature control system comprising in combination: radiant heat means adapted when energized to heat an object; sensing means providing an electrical information signal proportional to the temperature of said object; error signal means coupled with said sensing means for receiving said information signal and providing an error signal proportional to the difference between the desired and the actual temperature of said object; rate signal means coupled with said sensing means for receiving said information signal and providing an electrical rate signal proportional to the rate of change of temperature of said object; power means coupled with said radiant heat means adapted to provide electrical energy thereto; power signal means coupled with said radiant heat means adapted to provide a power signal which is a function of the electrical energy supplied to said heater means; and power control means coupled with said power means adapted to receive said rate, error, and power signals and in response thereto to apply a control signal to said power means proportional to the sum of said error and power signal minus said rate signal which causes said heater means to receive only sufficient power in the absence of an error signal to overcome system thermal losses and to further cause said heater means to receive a changing amount of power during the existence of an error signal to thereby reduce the magnitude of said error signal.

9. A temperature control system comprising in combination: sensing means including a thermocouple secured to an object to be heated and thereby adapted to provide a first signal representative of the temperature of an object to be heated; means responsive to said first signal to provide an error signal representative of the difference between the actual temperature of said object and the desired temperature of said object; heating means including infrared lamps operable when energized to apply heat to said object with said object being positioned for heating by said lamps in order to avoid interference with dissipation of heat by said object; power means operable to energize said heating means; circuit adapted to provide a power signal which is a function of the power applied to said heating means; means coupled with said sensing means adapted to provide a rate signal proportional to the rate of change of temperature of said object; circuit means adapted to add said error signal with said power signal and to subtract said rate signal to thereby provide a control signal; and means responsive to said control signal for controlling the power provided by said power means to said heating means.

10. A temperature control system comprising in combination: electric heater means adapted when energized to apply heat to a specimen; electric power means adapted to apply electric power to said heater means; circuit means coupled with said power means adapted to provide a power signal which is a function of the power applied to said heater means and including a signal transformer having a primary winding in parallel with said electric heater means and a secondary winding having a rectifier and a resistor connected in series thereacross; sensing means adapted to provide an information signal proportional to the temperature of said specimen; rate circuit means coupled with said sensing means adapted to provide a rate signal proportional to the rate of change of the temperature of said specimen; program means adapted to provide a program signal corresponding to the level of signal provided by said sensing means when said specimen is at a selected temperature; error signal means having said program signal and said information signal applied thereto and adapted to provide an error signal proportional to the difference between said program and information signals; and electric power control means responsive to said power, error, and rate signals to provide a control signal to said power means to thereby cause said power means to apply to said heater sufficient power to correct for heat losses in the system and to change the temperature of said specimen until said error and rate signals are reduced substantially to zero, said power means including a first summing network adapted to provide a loss compensation signal proportional to the difference between said rate signal and said power signal, and a second summing network adapted to provide a signal which is proportional to said error signal and to said loss compensation signal, said first summing network including a capacitor coupled with said resistor and connected to said rate circuit means and adapted to have said rate signal applied thereto, said second summing network including a first amplifier having a control electrode adapted to have said error signal applied thereto and having a load circuit, a second amplifier having a control electrode coupled with said capacitor and having a load circuit, said power control means further including means controlling the power applied to said heater means in accordance with the difference in current flow in said load circuits.

References Cited by the Examiner

UNITED STATES PATENTS

| | | | |
|---|---|---|---|
| 2,666,889 | 1/1952 | Ehret et al. | 219—497 |
| 2,724,040 | 11/1955 | Mounzon | 219—497 |
| 2,857,104 | 10/1958 | Gilbert | 219—497 |
| 3,036,188 | 5/1962 | Ditto | 219—503 |
| 3,047,647 | 7/1962 | Harkins et al. | 13—6 |
| 3,180,974 | 4/1965 | Darling | 219—497 |
| 3,202,800 | 8/1965 | Phillips, et al. | 219—497 |

RICHARD M. WOOD, *Primary Examiner.*

L. H. BENDER, *Assistant Examiner.*